US009081971B2

(12) United States Patent
Arnold et al.

(10) Patent No.: US 9,081,971 B2
(45) Date of Patent: *Jul. 14, 2015

(54) METHOD OF PARSING OPTIONAL BLOCK DATA

(71) Applicant: International Business Machines Corporation, Armonk, NY (US)

(72) Inventors: Todd W. Arnold, Charlotte, NC (US); Carsten D. Frehr, Farum (DK); Richard V. Kisley, Charlotte, NC (US)

(73) Assignee: International Business Machines Corproation, Armonk, NY (US)

( * ) Notice: Subject to any disclaimer, the term of this patent is extended or adjusted under 35 U.S.C. 154(b) by 181 days.

This patent is subject to a terminal disclaimer.

(21) Appl. No.: 13/655,041

(22) Filed: Oct. 18, 2012

(65) Prior Publication Data
US 2013/0054624 A1 Feb. 28, 2013

Related U.S. Application Data

(63) Continuation of application No. 13/118,925, filed on May 31, 2011, now Pat. No. 8,538,939.

(51) Int. Cl.
*G06F 17/30* (2006.01)
*G06F 21/60* (2013.01)

(52) U.S. Cl.
CPC ........ *G06F 21/602* (2013.01); *G06F 17/30011* (2013.01); *G06F 2221/2107* (2013.01)

(58) Field of Classification Search
None
See application file for complete search history.

(56) References Cited

U.S. PATENT DOCUMENTS

| 7,577,250 | B2 | 8/2009 | Damgaard |
| 8,077,861 | B2 | 12/2011 | Damgaard |
| 8,155,310 | B2 | 4/2012 | Damgaard |
| 2001/0038347 | A1 * | 11/2001 | Avery et al. ...................... 341/51 |
| 2004/0001595 | A1 | 1/2004 | Hopkins |
| 2004/0003246 | A1 * | 1/2004 | Hopkins et al. ............... 713/168 |
| 2006/0002549 | A1 | 1/2006 | Avasarala |
| 2007/0156603 | A1 | 7/2007 | Yoon |
| 2008/0077794 | A1 * | 3/2008 | Arnold et al. ................. 713/169 |
| 2009/0232312 | A1 | 9/2009 | Inoue |
| 2010/0031021 | A1 | 2/2010 | Arnold |
| 2010/0158247 | A1 | 6/2010 | Hopkins |

OTHER PUBLICATIONS

Office Action for U.S. Appl. No. 13/118,925 dated Oct. 1, 2012.
Non-Final Office Action issued in U.S. Appl. No. 13/656,138, mailed Aug. 2, 2014; 10 pages.

* cited by examiner

*Primary Examiner* — Rehana Perveen
*Assistant Examiner* — Hung Havan
(74) *Attorney, Agent, or Firm* — Cantor Colburn LLP; Steven Chiu

(57) ABSTRACT

A computer program product is provided and includes a tangible storage medium readable by a processing circuit and on which instructions are stored for execution by the processing circuit for performing a method. The method includes initially verifying a presence of parameters passed to a parameter database and that a selected group of the parameters are greater than or equal to zero, parsing optional block data to validate the optional block data, determine a length thereof and a number of optional blocks contained therein and proceeding with one of a secondary info-parsing and a secondary data-parsing operation with respect to the optional block data in accordance with content of the parameters passed to the parameter database.

4 Claims, 7 Drawing Sheets

METHOD OF PARSING OPTIONAL BLOCK DATA

CROSS REFERENCE TO RELATED APPLICATION

This application is a continuation of and claims the benefit of priority to U.S. application Ser. No. 13/118,925, which was filed on May 31, 2011. The entire contents of U.S. application Ser. No. 13/118,925 are incorporated herein by reference.

BACKGROUND

The present invention relates to data processing, and more specifically, to cryptography methods and structures.

Vendors of security software have proprietary key management data structures and control mechanisms to aid in the implementation of customer key management policies. These data structures are called key tokens or key blocks. Recently, as the need for increased security has grown, different entities have begun to use varied key management data structures from different vendors. This has led to a need for an interface between such varied key management data structure systems of the different vendors.

A technical report (TR) was thus developed through the American National Standards Institute (ANSI) X9 working group to create a format for key exchange between interested parties. This format is referred to as TR-31 and specifies that the layout of a standardized key block includes several data fields for key type, algorithm and control, as well as wrapping mechanisms that use another key to wrap the key as an opaque data block placed in a payload after the key block. The wrapping mechanism specifies a method of cryptographically binding key control information into the key block as part of the wrapping mechanism. In particular, a TR-31 key block defines attribute fields for key usage, key management and wrapping information along with several other fields for other purposes. A TR-31 key block does not, however, specify methods for mapping proprietary key data structures to the TR-31 key block.

For example, a given cryptographically enabled computing system may include a hardware security module (HSM) that implements a Common Cryptographic Architecture (CCA), which specifies a byte array of key control information (i.e., a Control Vector (CV)), which is cryptographically bound in a key token to a cryptographic key. In this case, the CV controls the key control information inside the HSM secure boundary and concerns key usage and key management, with data representing a key type, a key sub-type, key management policies and key usage policies. The key type is the broad capability the key may be used for, such as enciphering and/or deciphering data, wrapping or unwrapping keys, computing or verifying message authentication codes, use in various financial operations, such as encrypting or decrypting PIN information, and generating or verifying PIN information. The key sub-type is a restriction on key capability within actions supported by the key type, such as limiting the key to only be used for enciphering data or deciphering data, but not for both. Key management policies controls how the key may be distributed (or not distributed), such as whether the key is exportable to another system (at all) and, if so, whether it is exportable while being wrapped in a TR-31 key block. The key usage policies controls how the key may be used beyond those limits imposed by type and sub-type, such as limits on types of data that can be processed (for keys that will be encipher/decipher keys) or types of keys that may be wrapped with the key (for keys that will be used for wrapping/unwrapping other keys). As mentioned above, methods for translating such CCA CV data into a representation appropriate for the TR-31 key block have not been specified.

SUMMARY

According to an aspect of the present invention, a computer program product is provided and includes a tangible storage medium readable by a processing circuit and on which instructions are stored for execution by the processing circuit for performing a method. The method includes initially verifying a presence of parameters passed to a parameter database and that a selected group of the parameters are greater than or equal to zero, parsing optional block data to validate the optional block data, determine a length thereof and a number of optional blocks contained therein and proceeding with one of a secondary info-parsing and a secondary data-parsing operation with respect to the optional block data in accordance with content of the parameters passed to the parameter database.

According to another aspect of the present invention, a method is provided. The method includes initially verifying a presence of parameters passed to a parameter database and that a selected group of the parameters are greater than or equal to zero, parsing optional block data to validate the optional block data, determine a length thereof and a number of optional blocks contained therein and proceeding with one of a secondary info-parsing and a secondary data-parsing operation with respect to the optional block data in accordance with content of the parameters passed to the parameter database.

According to yet another aspect of the present invention, a system is provided. The system includes a processing circuit configured to perform a method. The method includes initially verifying a presence of parameters passed to a parameter database and that a selected group of the parameters are greater than or equal to zero, parsing optional block data to validate the optional block data, determine a length thereof and a number of optional blocks contained therein and proceeding with one of a secondary info-parsing and a secondary data-parsing operation with respect to the optional block data in accordance with content of the parameters passed to the parameter database.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Aspects of the present invention concern a method for mapping key token control information to data fields specified by a standard key block, where the method includes an export operation. An output key block will contain key control information cryptographically bound to key material via a wrapping method of the standard key block. That key control information will be derived from the key token disambiguation information for guiding the translation, which is specified prior to or during the export operation. Aspects of the present invention also concern a method for iteratively building a valid bundle of optional blocks for use as input in later creating a standardized key block. Aspects of the present invention also specify a method of encoding the key token information in a representation suitable for use in the key block optional blocks and a method for securely recording that this operation is allowed or not allowed.

Aspects of the present invention also concern a method for mapping information of data fields specified by a standard key block to key token information, where the method includes an import operation. This is distinct from the export case for reasons that the security trade-offs are asymmetric and, on import, a local system may be compromised. The output key token will contain key control information cryptographically bound to the key material via a defined wrapping method. That key control information will be derived from the key control information in the standard key block and disambiguation information for guiding the translation, which is specified prior to or during the import operation. Aspects of the present invention also concern a method for parsing and validating a standard key block and returning specific and/or requested information about optional block data resident in the key block.

Figure 1:
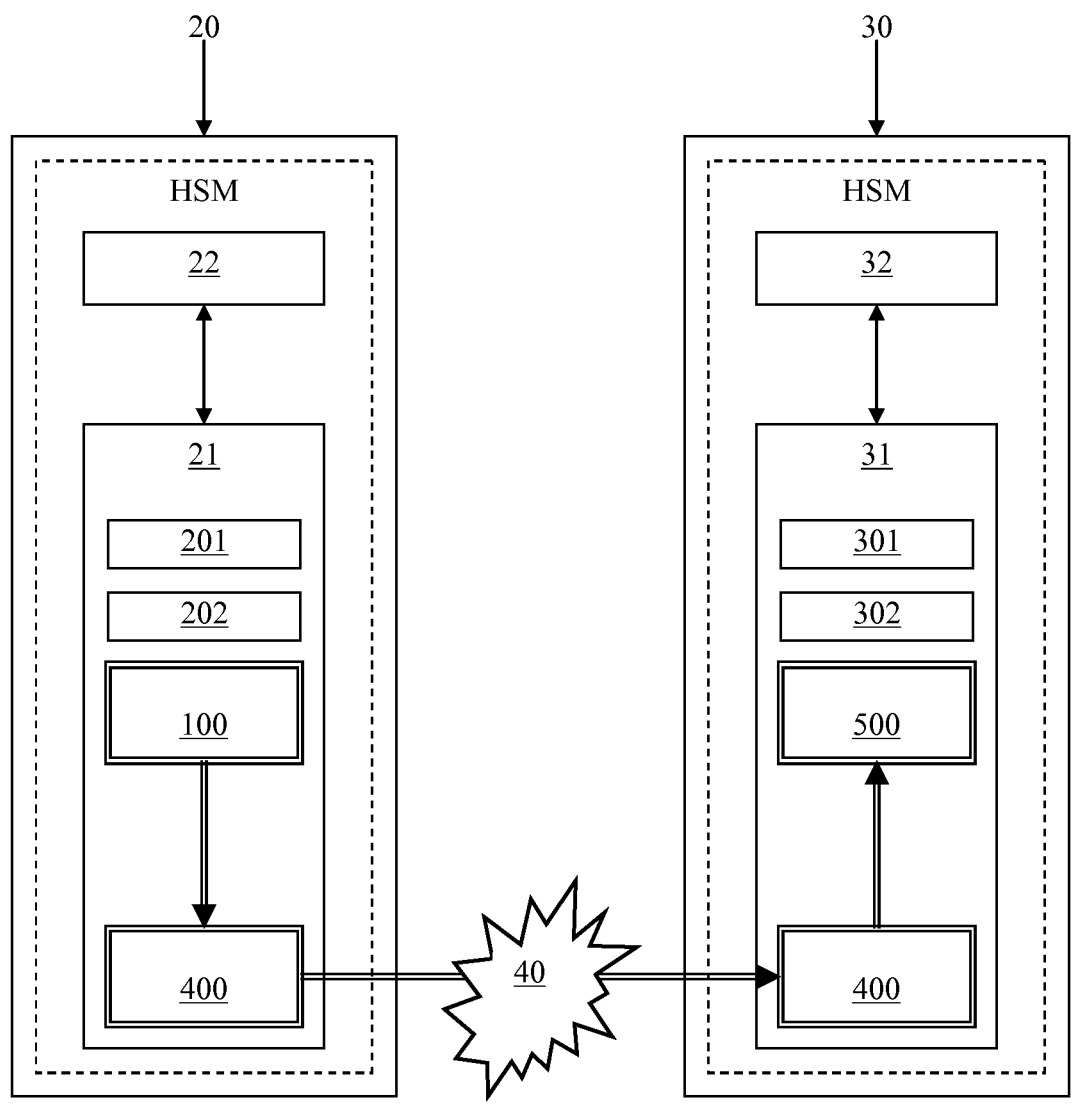
FIG. 1 is a schematic diagram of a computing system.

With reference to FIG. 1, a computing system 10 is provided as an access control system in which capabilities of users are limited by service and by specific functions that are executable within that service. Each capability is referred to as an access control point (ACP). The access control system which manages the ACPs for user operations may be embodied to control access within cryptographic processing systems that include at least first and second computing devices 20 and 30.

The first and second computing devices 20 and 30 are connected to one another via a wired or wireless network 40. Each of the first and second computing devices 20 and 30 includes a tangible storage medium 21 and 31 that is readable by a processing circuit 22 and 32 and has executable instructions stored thereon for execution by the processing circuit 22 and 32 for performing one or more of the methods described herein. In particular, each of the first and second computing devices 20 and 30 includes a respective hardware security module (HSM) cooperatively defined by the respective storage medium 21, 31 and the respective processing circuit 22, 32. The respective HSMs handle the binding of key control information to cryptographic keys among other duties and each may implement any one or more of several architectures to this end. As such, the respective HSMs may implement the same or different architectures.

In an exemplary case, the HSM of the first computing device 20 implements the common cryptographic architecture (CCA) and is instructed to send to the second computing device 30 a key token 100, which includes key control information and a cryptographic key to which the key control information is cryptographically bound. Thus, since the HSMs of each the first and second computing devices 20 and 30 may or may not implement the same architectures, it will be necessary for the HSM of the first computing device 20 to export the key control information in a secure manner to a standardized key block by way of a parameter database 201 and a translation table 202, which are each stored in the storage medium 21, and for the HSM of the second computing device 30 to import the exported key control information from the key block by way of a parameter database 301 and a translation table 302, which are each stored in the storage medium 31.

As noted above, the HSMs may each implement the same (i.e., the CCA) or different architectures but, in either case, it may be necessary for the HSM of the first computing device 20 to modify the key token 100 to thereby generate the standardized key block 400 (hereinafter referred to as "key block 400"), which includes the key control information that has been exported. It may be further necessary for the HSM of the second computing device 30, having received the key block 400, to import the key control information from the key block 400 and into a new key token 500. Thus, the HSMs of the first and second computing devices 20 and 30 may be required to execute a translation of information with respect to the key block 400 (i.e., either by translating information into a format of the key block 400 in an export operation or vice versa in an import operation).

In the example of the HSMs each using the CCA, the translation tables 202, 302 provide a mapping to/from various key block 400 usage and mode values from/to CV key type and sub-type values. The "Output CCA Type" values and "Output CCA Usage" values are defined according to the CCA documentation. Each translation may require a potentially unique ACP to be enabled and, in this way, system security administrators can directly control by user which CCA key types that user is allowed to import from the key block 400 format. This is important since key blocks 400 are often importable to more than 1 CCA Type and Sub-Type combination.

While the description provided herein may relate to multiple architectures for cryptographically binding key control information to cryptographic keys and to any standardized key block, for purposes of clarity and brevity it will be assumed that the respective HSM of each of the first and second computing devices 20 and 30 implements the CCA and that the key block 400 is that of the ANSI TR-31 (hereinafter "TR-31").

Figure 2:
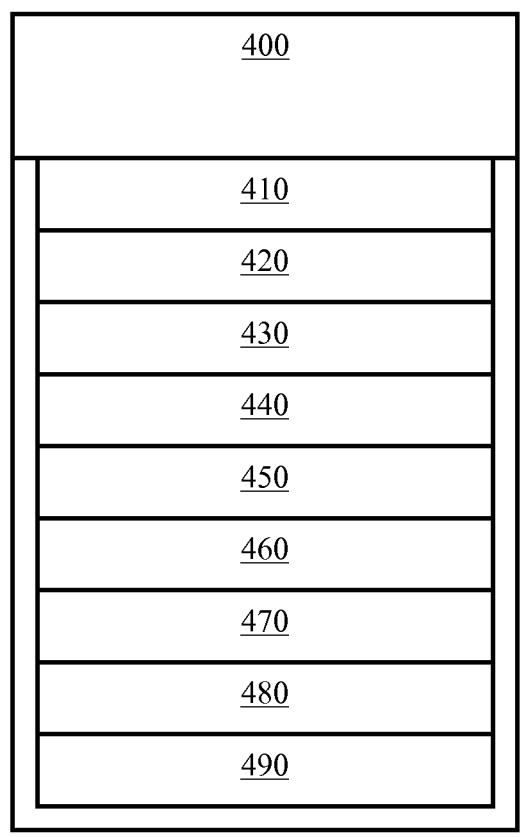
FIG. 2 is a diagram of key block fields.

With reference to FIG. 2, the key block 400 includes at least nine key block fields as follows. The key block version identification (ID) field 410 identifies a version of the key block 400 that itself defines a method by which the key block 400 is cryptographically protected and further identified content and layout of the key block 400. The key block length field 420 provides a length of the key block 400. The key usage field 430 provides information about an intended function of the protected key and/or sensitive data that is cryptographically bound to the key block 400. The algorithm field 440 indicates the algorithm for which the protected key and/or sensitive data that is cryptographically bound to the key block 400 may be used. The modes of use field 450 defines an operation the protected key and/or sensitive data that is cryptographically bound to the key block 400 can perform. The key version number field 460 is a character version number to indicate that contents of the key block 400 are components of old keys or to prevent re-injection of old keys. The exportability field 470 defines whether the protected key and/or sensitive data that is cryptographically bound to the key block 400 may be transferred outside the cryptographic domain. The number of optional blocks field 480 defines a number of optional blocks included in the key block 400. The optional blocks field 490 includes a variable number of optional blocks that each contain an ID, length information and variable length data.

In an export operation, a user of the first computing device 20 passes the following parameters to an object such as the parameter database 201, which is accessed by the HSM of the first computing device 20 to export the key control information to the key block 400. The parameters include rule array keywords that are indicative of corresponding instructions, such as a single key block protection method to be placed in the key block version ID field 410, a key usage value for the output key block 400 to be placed in the key usage field 430, a mode of key use to be placed in the modes of use field 450, an optional export control code to set the exportability field 470 and an optional control vector transport control to be placed in the optional blocks field 490.

The key block protection method may be any one of a VARXOR-A type using the variant method corresponding to TR31-KBV and is identified by an "A" being placed in the key block version ID field 410, a VARDRV-B type using the key derivation method corresponding to TR31-KBV and is identified by a "B" being placed in the key block version ID field 410 and a VARXOR-C type using the variant method corresponding to TR31-KBV and is identified by a "C" being placed in the key block version ID field 410.

The key usage value may be any one of a base derivation key having a keyword "BDK," which is identified by "B0" being placed in the key usage field 430, a card verification key having a keyword "CVK," which is identified by "C0" being placed in the key usage field 430, a data encryption key have a keyword "ENC," which is identified by "D0" being placed in the key usage field 430, an EMV application cryptogram master key having a keyword "EMVACMK," which is identified by "E0" being placed in the key usage field 430, an EMV secure messaging for confidentiality master key having a keyword "EMVSCMK," which is identified by "E1" being placed in the key usage field 430, an EMV secure messaging for integrity master key having a keyword "EMVSIMK," which is identified by "E2" being placed in the key usage field 430, an EMV data authentication code key having a keyword "EMVDAMK," which is identified by "E3" being placed in the key usage field 430, an EMV dynamic numbers master key having a keyword "EMVDNMK," which is identified by "E4" being placed in the key usage field 430, an EMV card personalization master key having a keyword "EMVCPMK," which is identified by "E5" being placed in the key usage field 430, a key-encrypting key having a keyword "KEK," which is identified by "K0" being placed in the key usage field 430, a key-encrypting key for wrapping TR-31 blocks having a keyword "KEK-WRAP," which is identified by "K1" being placed in the key usage field 430, a key for ISO 16609 MAC algorithm 1 using TDES having a keyword "ISOMAC0," which is identified by "M0" being placed in the key usage field 430, a key for ISO 9797-1 MAC algorithm 1 having a keyword "ISOMAC1," which is identified by "M1" being placed in the key usage field 430, a key for ISO 9797-1 MAC algorithm 3 having a keyword "ISOMAC3," which is identified by "M3" being placed in the key usage field 430, a PIN encryption key having a keyword "PINENC," which is identified by "P0" being placed in the key usage field 430, a PIN verification key, an "other" algorithm having a keyword "PINVO," which is identified by "V0" being placed in the key usage field 430, a PIN verification key for IBM 3624 algorithm having a keyword "PINV3624," which is identified by "V1" being placed in the key usage field 430, and a PIN verification key, VISA PVV algorithm having a keyword "VISAPVV," which is identified by a "V2" being placed in the key usage field 430.

The mode of key use may be any one of encrypt and decrypt having a keyword "ENCDEC," which is identified by a "B" being placed in the modes of use field 450, decrypt only having a keyword "DEC-ONLY," which is identified by a "D" being placed in the modes of use field 450, encrypt only having a keyword "ENC-ONLY," which is identified by an "E" being placed in the modes of use field 450, MAC or PIN generate and verify having a keyword "GENVER," which is identified by a "C" being placed in the modes of use field 450, MAC or PIN generate only having a keyword "GEN-ONLY," which is identified by a "G" being placed in the modes of use field 450, MAC or PIN verify only having a keyword "VER-ONLY," which is identified by a "V" being placed in the modes of use field 450, key Derivation having a keyword "DERIVE," which is identified by an "X" being placed in the modes of use field 450 and any mode allowed having a keyword "ANY," which is identified by an "N" being placed in the modes of use field 450.

The optional export control code to set the exportability field 470 may indicate any one of export being allowed using any key-encrypting key having a keyword "EXP-ANY," which is identified by an "S" being placed in the exportability field 470, export being allowed using a trusted key-encrypting key, as defined in the standards for the key block 400, having a keyword "EXP-TRST," which is identified by an "E" being placed in the exportability field 470 and export being prohibited having a keyword "EXP-NONE," which is identified by an "N" being placed in the exportability field 470. The optional control vector transport control to be placed in the optional blocks field 490 may indicate any one of an instruction to include a CV as an optional field in the key block 400 header having a keyword "INCL-CV" where the key usage field 430 and the modes of use field 450 will be set to non-numeric values according to the translations described below and an instruction to include the CV as an optional field in the key block 400 header having a keyword "ATTR-CV" where the key usage field 430 and the modes of use field 450 are set to predefined values.

The parameters further include a "key version number," a "key field length," a "source key identifier length," a "source key identifier," an "unwrap kek identifier length," an "unwrap kek identifier," a "wrap kek identifier length," a "wrap kek identifier," an "opt blks length," an "opt blocks," a "tr31 key block length" and a "tr31 key block." The key version number parameter may be a two byte number and may be copied into the key version number field 460 of the key block 400 unless the source key identifier parameter in the key token 100 is a key part in which case this parameter will be ignored and the key version number field will be set to a value of "c0." The key field length parameter may be an integer parameter that specifies a length of a key field encrypted in the key block 400. In accordance with embodiments, the length is a multiple of 8 and greater than or equal to a length of a "cleartext" key passed in the key token 100 with the source key identifier parameter plus a length of a 2-byte key length that precedes this key in the key block 400. The source key identifier length parameter points to an integer specifying a length of the source key identifier parameter. The source key identifier parameter points to a string variable containing the key token 100 to be exported. The unwrap kek identifier length parameter points to an integer specifying a length of the unwrap kek identifier parameter. The unwrap kek identifier parameter points to a string variable containing the key token 100 containing a wrapping key for unwrapping if the key token 100 in the source key identifier parameter is wrapped under a different key than the key kept inside the HSM of the first computing device 20. If no wrap kek identifier parameter is specified, this parameter will be used for wrapping the key block 400. The wrap kek identifier length parameter points to an integer specifying a length of the wrap kek identifier parameter. The wrap kek identifier points to a string variable containing the key token 100 containing the wrapping key for wrapping the key block 400. The opt blks length parameter points to an integer variable which specifies a length of the opt blocks parameter. The opt blocks parameter points to a buffer containing an array of optional blocks to be included in the output key block 400. The array of optional blocks may be required to have been prepared in a proper format previously. The tr31 key block length parameter points to an integer specifying a length of the tr31 key block parameter. In accordance with embodiments, on input, the tr31 key block length parameter specifies a size of the buffer available for the output key block 400 and, on return, the tr31 key block length parameter is updated to contain an actual length of that returned token. The tr31 key block points to a string variable where the output key block 400 will be placed.

Figure 3:
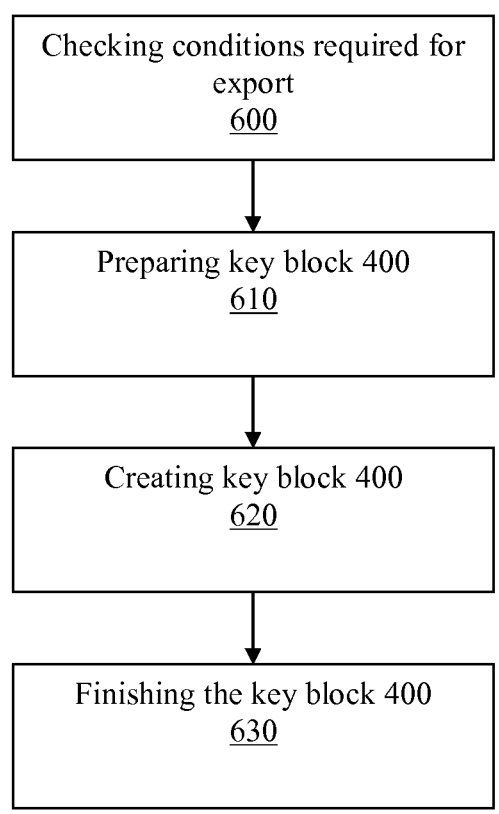
FIG. 3 is a flow diagram illustrating a method of mapping key information in an export operation.

With reference to FIG. 3, the export process will now be described. Initially, conditions required for export are checked at operation 600. The checking includes a validation of the rule array parameter, the validation including a minimum number of keywords and only 1 from each required group of keywords, and a verification that none of the rule array, key version number, key field length, source key identifier length, source key identifier, unwrap kek identifier length, unwrap kek identifier, wrap kek identifier length, wrap kek identifier, opt blks length, opt blocks, tr31 key block length and tr31 key block parameters are missing, as discovered in some embodiments by detecting null pointers. If any parameters are absent (i.e., they are null pointers), the process aborts.

The checking of operation 600 further includes a validation of the key token 100 passed in the source key identifier, unwrap kek identifier and wrap kek identifier parameters. This validation includes a verification that the value passed with the source key identifier parameter is a valid key token 100 with version, length, control information and, if not, the process aborts. The validation further includes a verification that the value passed with the unwrap kek identifier is a valid key token 100 and, if not, the process aborts. When both the source key identifier parameter and the unwrap kek identifier parameter have been parsed, the key material in the source key identifier is unwrapped using either the unwrap kek identifier parameter or the wrapping key maintained inside the HSM of the first computing device 20. The validation still further includes a verification that the value passed with the wrap kek identifier is a valid key token 100 and if any token was passed. If not, the process aborts.

The checking of operation 600 further includes a verification of whether the key token 100 received in the unwrap kek identifier parameter has a CV with permission to unwrap or translate the source key identifier parameter, a verification of whether the key token 100 received in the wrap kek identifier parameter has a CV with permission to wrap or translate the source key identifier parameter and a validation of whether the key token 100 in the source key identifier parameter can be exported. It is also determined at this time whether the key token 100 can be exported as the key block 400 with a check made as to whether the requested operation is authorized for appropriate ACPs.

If results of the checking of operation 600 are affirmative, the method continues at operation 610 by preparing the key block 400. This operation initially involves a validation of the key field length parameter and a validation of optional blocks passed in the opt blocks parameter. This validation involves duplicate block tags not being allowed, numeric block tags being allowed, alphabetic block tags being required to conform to standards, length fields being sufficient, a calculation of a num opt blocks parameter (if the count is greater than a predefined number, such as 99, the process aborts), a determination of whether a total length of the optional blocks section would force the key block 400 total length to be too large and a copying of the optional blocks to the optional blocks field 490.

The preparing of operation 610 further includes preparing any additional optional blocks, such as an optional block to carry an encoded version of the source key identifier parameter CV, and a validation that the key version number is formatted properly. If the passed key version number parameter starts with 'c' and the key token 100 is not partial, the process aborts. If the passed key version number parameter starts with 'c' and the key token 100 is partial, the process uses the passed version number instead of the default 'c0'. If the passed key version number parameter does not start with 'c' and the key token 100 is partial, the key version number parameter will be completely ignored and 'c0' will be used for the key block 400.

Following the preparing of operation 610, the method continues by creating the key block 400 at operation 620. The creating of operation 620 includes creating and filling an empty key block 400 structure and determining the CV translation method to be used for the key block 400. The determining includes preparing the optional blocks field 490 with the CV and preparing the key usage field 430 and the modes of use field 450 based on the CV as described in the translation table 202 if INCL-CV is passed to the parameter database 201. Alternatively, the determining includes preparing the optional blocks field 490 with the CV and setting the key usage field 430 and the modes of use field 450 to predefined values if ATTR-CV is passed to the parameter database 201. In accordance with still another alternative, the determining includes preparing the key usage field 430 and the modes of use field 450 based on the CV as described in the translation table 202 if no keyword is passed to the parameter database 201.

Following the creating of operation 620, the key block 400 is finished at operation 630. The finishing of operation 630 includes preparing a key carrying section of the key block 400 according to the prescribed wrapping method, concatenating the wrapped key section after the optional blocks field 490 to create the key block 400 and copying the key block to the tr31 key block parameter and updating the tr31 key block length to the final length.

In accordance with further aspects of the invention, a method is provided whereby a valid array of optional blocks formatted for the key block 400 is iteratively built.

A user of the invention passes the following parameters, which are all defined as pointers, to the parameter database 201 in accordance with the invention, via other methods or by value. The parameters include an opt blocks bfr length parameter, an opt blocks length parameter, an opt blocks parameter, a num opt blocks parameter, an opt block id parameter, an opt block data length parameter and an opt block data parameter. The opt blocks bfr length parameter points to an integer containing a length of a buffer passed with the opt blocks parameter. This length is used to determine if adding a new optional block to the current contents of the buffer would overflow the buffer. The opt blocks length parameter points to an integer containing the length of the data in the opt blocks buffer. On input, it specifies the length of the data currently in the optional block. On output, it is updated with the length after the new optional block has been added to the set of optional blocks in that buffer. The opt blocks parameter points to a buffer containing the set of optional blocks being built. Initially, it will be empty and then an optional block will be appended to the buffer with each iteration. The opt blocks bfr length parameter specifies the total length of this buffer, and an error will be returned if this length would be exceeded by adding the optional block in the opt block data parameter to the current contents. The num opt blocks parameter points to an integer containing the number of optional blocks contained in the structure returned in the opt blocks parameter. This is provided as an output parameter so that it can subsequently be used as an input to processing that may build a full key block 400. This parameter is not examined on input and is only updated on successful output. The opt block id parameter points to a two-byte value which is to be the identifier tag of the optional block passed in the opt block data parameter. The opt block data length parameter points to an integer specifying the length of the data passed in the opt block data parameter. This length may be zero as an optional block may validly have a tag and a length but no data. The opt block data parameter points to a buffer where the application passes the data for the optional block that is to be added to those already in the buffer in the opt blocks parameter. The length of this data is specified in the opt block data length parameter.

Figure 4:
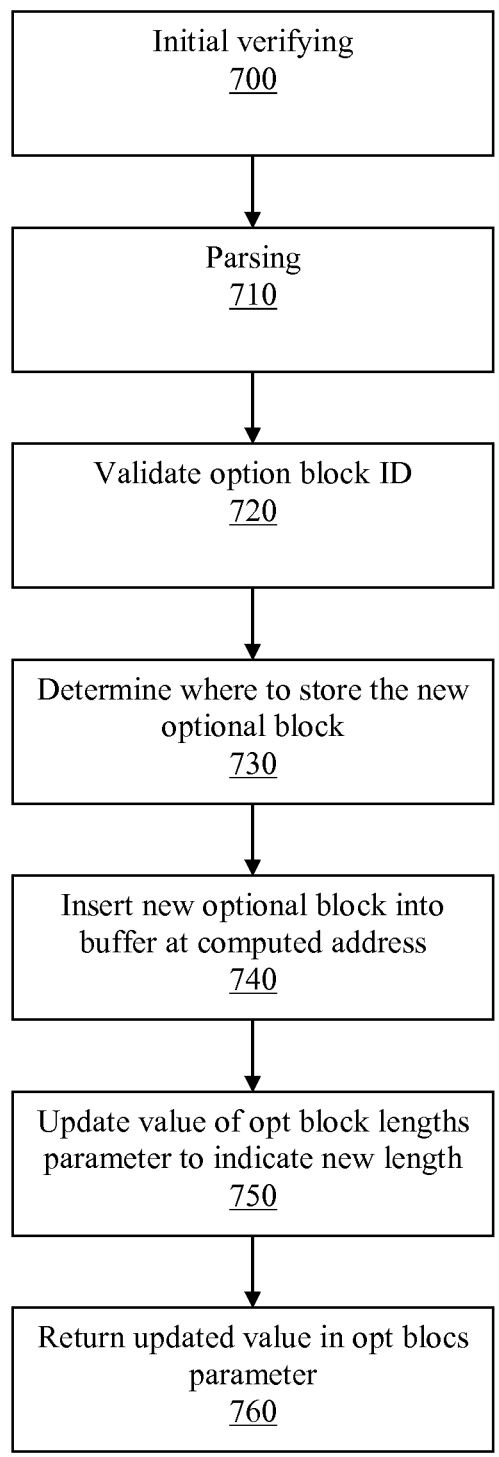
FIG. 4 is a flow diagram illustrating a method of building optional blocks.

With reference to FIG. 4, the method of iteratively building the valid array of optional blocks formatted for the key block 400 in accordance with embodiments is illustrated.

The method includes an initial verifying operation 700 followed by a parsing operation 710. The verifying of operation 700 includes a verification that none of the opt blocks bfr length, opt blocks length, opt blocks, num opt blocks, opt block id, opt block data length or opt block data parameters are absent (i.e., they are null pointers). If any are null, the process aborts. Next, it is verified that none of the opt blocks bfr length, opt blocks length, num opt blocks, opt block data length integer parameters have a negative value (i.e., they have a value that is greater than or equal to zero). Then, it is verified that the buffer has enough space to add the new optional block to it.

The parsing of operation 710 includes a parsing of the optional block data in the opt blocks parameter to validate it and to determine its length and the number of optional blocks it contains in case the user has prepared part of the buffer themselves such that the invention must be able to maintain a guarantee that the output array of optional blocks is completely valid. The parsing of operation 710 further prohibits duplicate block tags, permits numeric block tags, verifies that alphabetic block tags are properly formatted for the key block 400, verifies that the length fields are of sufficient length and determines that, if the num opt blocks parameter is equal to 99, another optional block cannot be added.

Following the parsing of operation 710, the optional block ID to be added is validated at operation 720 where an attempt by the user to add a padding block "PB" is prevented. In accordance with operation 720, duplicate block tags to those already in the array are not allowed, numeric block tags are allowed and alphabetic block tags must be properly formatted for the key block 400. Next, it is determined at operation 730 where to store the new optional block within the buffer in accordance with the value of the opt blocks parameter.

The new optional block is then inserted into the buffer in accordance with the opt blocks parameter at the starting address computed above at operation 740. The inserting includes a verification that the value in the opt block id parameter is properly formatted, a copying of the value from the opt block id parameter to the optional block field 490, a verification that the value is appropriate, a conversion of the length value from the opt block data length parameter into a proper format, a copying of that properly formatted length value to the key block length field 420, a verification that the data in the buffer is properly formatted and a copying of the data passed in the opt block data parameter to the key block 400.

At operation 750, the value of the opt blocks length parameter is updated to indicate the new length after adding the new optional block such that the value of the opt blocks length parameter equals the value of the opt blocks length parameter plus the new data length parameter. At operation 760, the correct total new count in the value of the num opt blocks parameter for the optional blocks is returned in the value of the opt blocks parameter.

In accordance with further aspects of the invention, the user of first computing device 20 may wish to be able to keep his CV cryptographically bound to the key even when exporting the key token 100 in a key block 400 in case the HSM of the second computing device 30 also implements the same architecture of the first computing device 20. Normally, however, key blocks 400 do not have specified methods for mapping proprietary key control data structures such as the CCA CV to the key block 400. Accordingly, a method is provided whereby proprietary material is encoded in the key block 400 in a representation suitable for the key block 400 with a secure recording of whether this operation is allowed or prohibited for a given CCA CV key being made.

The present method uses one optional block in the key block 400 and defines a format and a processing method to encode the CV in the optional block field 490. According to the key block 400 standards, certain numeric optional block tags represent proprietary information being represented in the optional block field 490. The present method concerns 2 items. The first is securely encoding a policy decision made by the user about whether the CCA key may be exported in the format of the key block 400. This policy is securely bound to the CCA key by executing the CCA key wrapping method inside the HSM such that if the CV policy bits are changed when the key carrying data structure is stored outside the HSM then the CCA key material value will be different when un-wrapped inside the HSM later and therefore useless. The second item concerns a formatting and an encoding of the data in the optional block 'data' section with the resultant optional block field 490 being laid out in accordance with the following.

Figure 5:
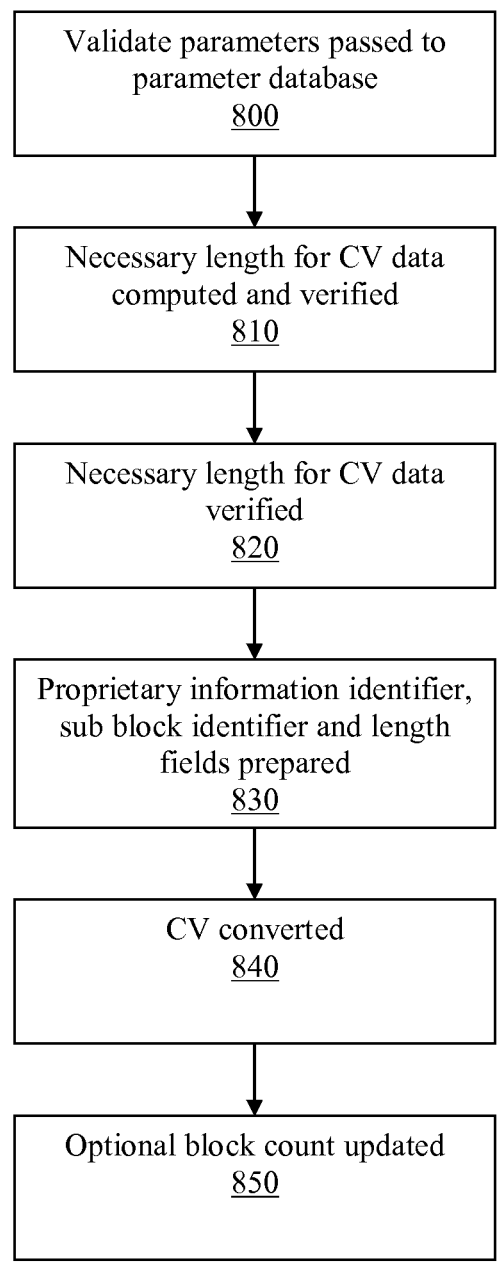
FIG. 5 is a flow diagram illustrating a method of protecting a control vector in an optional block.

With reference to FIG. 5, when the user of the first computing device 20 requests that the key token 100 be encoded in the key block 400 and requests that the CV accompany it, the method proceeds in accordance with the following. First, the parameters passed to the parameter database 201 are validated at operation 800. Here, the key token 100 is defined as a data structure containing a CV and a key cryptographically bound to the CV such that altering the CV changes the key and renders it useless, where the key token 100 is of a valid version and format, contains a key and a CV and the CV represents that the key token 100 is allowed to be exported in the key block 400. In addition, the key block 400 is defined at least initially as a partially prepared key block 400 with room for adding a new optional block and a count less than the maximum. Next, the necessary length for the CV data is computed and verified at operation 810 and an optional block tag and length fields of the key block 400 are prepared at operation 820. An identifier of proprietary information, a sub block identifier and length fields are prepared at operation 830 and the CV is converted to a proper format at operation 840. Finally, the optional block count is updated at operation 850.

In an import operation, a user of the second computing device 30 passes the following parameters to the parameter database 301, which is accessed by the HSM of the second computing device 30 to import information from the key block 400 to the new key token 500. The parameters include rule array keywords, such as a single key wrapping method, a "C0" sub group, a "K0" or "K1" sub group, a "V0"/"V1"/"V2" sub group, an "E0"/"E2" sub group, an "E1" sub group, an "E5' sub group, a key derivation level and a key type modifier. The single key wrapping method may be one of "INTERNAL," referring to an internal key token, and "EXTERNAL," referring to an external key token. As defined by the translation table 302, each of the sub groups corresponds to an instruction within the new key token 500.

Within the "C0" sub group may be one of CVK-CVV and a CVK-CSC instructions to convert the key block 400 CVK instruction to a new key token 500 instruction for use in calculating various credit card verification values. Within the "K0" or "K1" sub groups may be one of EXPORTER, OKEYXLAT, IMPORTER and IKEYXLAT instructions for the key block 400 K0-E/D or K0-B usage and mode keys to convert the key block 400 KEK instruction to a new key token 500 type key. Within the "V0"/"V1"/"V2" sub group may be one of PINGEN and PINVER instructions to convert a key block 400 PIB verification key to a new key token 500 PINGEN or PINVER key. Within the "E0"/E2" sub group may be one of DMAC and DMV instructions to convert the key block 400 EMV master key for application cryptograms or secure messaging instruction to new key token 500 DKYGENKY type key with DMAC or DMV sub types. Within the "E1" sub group may be one of DMPIN and DDATA instructions to convert a key block 400 EMV master key for Secure Messaging for Confidentiality instruction to a new key token 500 DKYGENKY type key with DMPIN or DDATA sub types. Within the "E5" sub group may be one of DMAC, DMV and DEXP instructions to convert a key block 400 EMV master key for card personalization to the new key token 500 type key with DMAC, DMV or DEXP sub types. Within the key derivation level may be one of DKYL0 and DKYL1 instructions to convert the key block 400 EMV master key to the new key token 500 type key at derivation level DKYL0 or DKYL1. Within the key type modifier may be a NOOFFSET instruction, which is valid only for "V0"/"V1" key block 400 usage values and which instructs the HSM of the second computing device 30 to import a PINGEN or PINVER type key into a key token 500 that cannot participate in the generation or verification.

The parameters further include a tr31 key block length parameter, a tr31 key block parameter, an unwrap kek identifier length parameter, an unwrap kek identifier parameter, a wrap kek identifier length parameter, a wrap kek identifier parameter, an output key identifier length parameter, an output key identifier parameter, a num opt blocks parameter, a cv source parameter and a protection method parameter. The tr31 key block length parameter points to an integer specifying the length of the tr31 key block parameter. The tr31 key block parameter points to a string variable containing the key block 400 input key block to be imported. The unwrap kek identifier length parameter points to an integer specifying a length of the unwrap kek identifier parameter. The unwrap kek identifier parameter points to a string variable containing the new key token 500 containing the wrapping key to use for unwrapping the tr31 key block parameter. If no wrap kek identifier is specified and the 'EXTERNAL' rule array keyword is passed, this parameter will also be used for wrapping the new key token 500 for output as well. The wrap kek identifier length parameter points to an integer specifying a length of the wrap kek identifier parameter. The wrap kek identifier parameter points to a string variable containing the new key token 500 containing the wrapping key to use for wrapping the output new key token 500, if a different wrapping key is required and the 'EXTERNAL' rule array keyword was passed. The output key identifier length parameter points to an integer specifying a length of the output key identifier parameter. On input, it must specify the size of the buffer available, and on return it is updated to contain the actual length of that returned token. The output key identifier parameter points to a string variable where the new key token 500 will be placed. The num opt blocks parameter points to an integer variable where the number of optional blocks that are present in the key block 400 will be placed. The cv source parameter points to an integer variable that will hold, on output, a value indicating how the CV in the output new key token 500 was created. It can be one of the following three values: 0x00 indicating that no CV was present in a key block 400 optional and the output CV was created based on input rule array keywords and the attributes in the key block 400, 0x01 indicating that a CV was obtained from an optional block in the key block 400, that the usage and mode were also specified and that compatibility was verified for these values with the CV and then that CV was used in the output new key token 500 or 0x02 indicating that a CV was obtained from an optional block in the key block 400, that the usage and mode held the predefined values indicating that the included CV was the only source of control information and that the CV from the key block 400 was used as the CV for the new key token 500. The protection method parameter points to an integer variable that will hold on output a value indicating what method was used to protect the input key block 400. It can be one of the following three values: 0x00, 0x01 or 0x02 indicating that the key block 400 was protected using the method with the key block version ID "A", "B", or "C."

Figure 6:
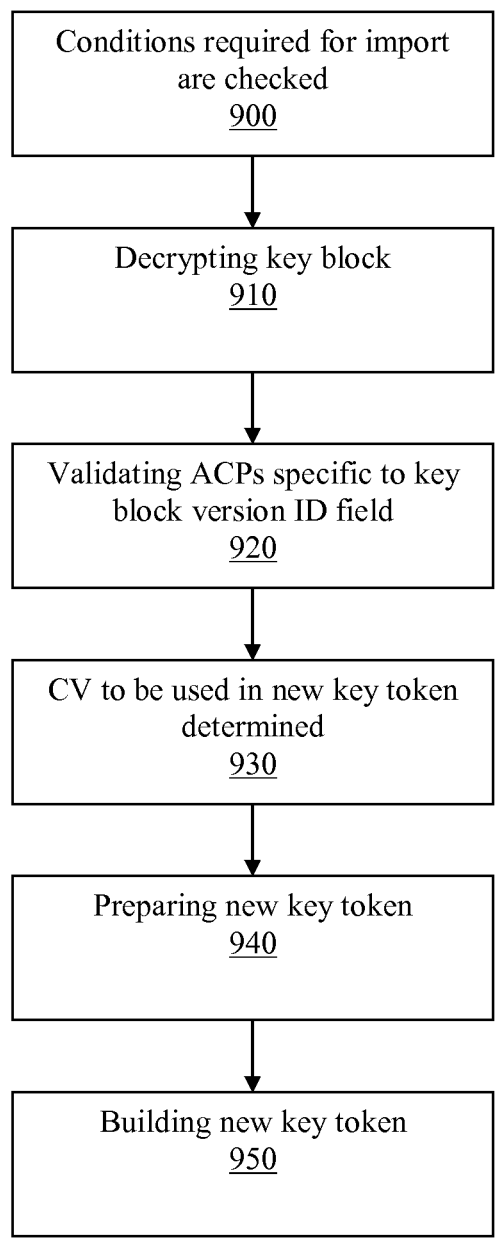
FIG. 6 is a flow diagram illustrating a method of mapping key information in an import operation.

With reference to FIG. 6, the import process will now be described. Initially, the conditions required for import are checked at operation 900. The checking includes a validation of the rule array parameter, the validation including a minimum number of keywords and only 1 from each required group of keywords and either 0 or 1 from each optional group of keywords, and a verification that none of the tr31 key block length, tr31 key block, unwrap kek identifier length, unwrap kek identifier, wrap kek identifier length, wrap kek identifier, output key identifier length, output key identifier, num opt blocks, cv source and protection method parameters are absent (i.e., they are null pointers).

The checking of operation 900 further includes a validation of the key token 100 passed to the parameter database 301 in the unwrap kek identifier and wrap kek identifier parameters. This validation includes a verification that the value passed to the parameter database 301 with the unwrap kek identifier parameter is valid and a verification that the value passed to the parameter database 301 with the wrap kek identifier is valid.

The checking of operation 900 further includes a verification of whether the key token 100 received in the unwrap kek identifier parameter has a CV with permission to unwrap or translate the tr31 key block parameter via the CV control set, a verification of whether the key token 100 received in the wrap kek identifier parameter has a CV with permission to wrap or translate the output key identifier parameter and a validation of the key block 400. This validation includes a validation of whether the key block fields have valid values with properly formatted text and particular field constraints and that the version of the key block 400 is supported.

This validation further includes parsing the optional block data in the key block 400 referred to by the tr31 key parameter to validate it, determine its length and the number of optional blocks it contains. The parsing includes verifying that the count of optional blocks corresponds to the count noted in the key block field for this count and to the num opt blocks parameter, confirming that the length fields are correct and properly formatted, prohibiting duplicate optional block tags, permitting numeric optional block tags, verifying that alphabetic block tags are properly formatter and, if a CV is found encoded in an optional block, translating the CV to binary data in preparation for validation.

Following the checking of operation 900, the method continues to operation 910 by decrypting the key block 400 using the key-encrypting key passed in the unwrap kek identifier parameter and the unwrapping method indicated by the key block version ID field 410 and, at operation 920, validating the ACPs specific to the key block version ID field 410. Then, the CV to be used in the new key token 500 is determined at operation 930. There are 3 determination possibilities: the CV may be passed as an optional block with numeric key bock 400 usage and mode values, the CV may be passed as an optional block with non-numeric key block usage and mode values that have to be checked against CV content and no CV may be passed as an optional block in the key block 400.

Where the CV is passed as an optional block with numeric key bock 400 usage and mode values, and if the key usage field 430 has a value of, for example, "10" and the modes of use field 450 has a value of, for example, "1," this CV will be used to construct the new key token 500 (if the value are numeric but different, the process aborts with an error). Where no CV is passed, the values of the key usage field 430 and the modes of use field 450 are validated against the rule array keywords that specify further interpretation in building the new key token 500, a key type, sub type and restrictions are chosen using the translation table 302 and the CV is created based on the chosen key type, sub type and rule array keywords.

Where the CV is passed as an optional block with a non-numeric key usage field 430 and a non-numeric modes of use field 450, compatibility between attributes in the CV and the non-numeric key usage field 430 and the non-numeric modes of use field 450 is verified using the translation table 302. If no compatibility exists, the process aborts and, if compatibility exists, appropriate ACP(s) are checked for operation, it is validated that if the key-part bits are on that the key version number field 460 is proper and this CV is used to construct the new key token 500.

At this point, the method proceeds by preparing and building the new key token 500 at operations 940 and 950, respectively. The preparing of operation 940 includes copying the chosen or created CV to a buffer and setting version and attribute fields. The creating of operation 950 proceeds as follows. If the 'EXTERNAL' rule array keyword is passed to the parameter database 301, the unwrap kek identifier or the wrap kek identifier parameters (if passed) are used to wrap key material from the unwrapped key block 400 along with the new CV with the result placed in the wrapped key fields of the new key token 500. If the 'INTERNAL' rule array keyword is passed, the HSM master key is used to wrap the key material from the unwrapped key block 400 along with the new CV with the result placed in the wrapped key fields of the new key token 500. Then, the value of the num opt block parameter is set according to the tr31 num opt parameter and the values of the cv source and the protection method parameters are set with reference to the translation table 302. The final output new key token 500 is then copied to the output key identifier parameter and the length in the output key identifier length parameter is updated.

In accordance with further aspects of the present invention, a method for parsing and validating information in the key block 400 and returning specific and/or requested information about optional block data resident in the key block 400 is provided. In accordance with the method, a user of the invention passes the following parameters, which are all defined as pointers, to the parameter database 301. The parameters may be passed in accordance with the invention, via other methods or by value.

The parameters include a rule array parameter, a tr31key length parameter and a tr31 key parameter. The rule array parameter points to a string variable containing a keyword indicating desired information. The keywords are 8 bytes in length and must be left-aligned and padded on the right with space characters. The rule array keywords include INFO, which is associated with an instruction to return information about an entire array of optional blocks in the key block 400, and DATA, which is associated with an instruction to return data contained in a specified optional block from the array of optional blocks. The tr31 key length parameter points to an integer containing a length of the tr31 key parameter and the tr31 key parameter points to a buffer containing the key block 400 that is to be parsed.

Parameters for the rule array keyword INFO parameter include a num opt blocks parameter, an opt block ids parameter and an opt block lengths parameter. The num opt blocks parameter points to an integer containing the number of optional blocks in the key block 400. The value is compared to the corresponding value in the key block header and if they do not match the method aborts with an error. The reason that this parameter is included is that the sizes of the buffers the user must provide for the opt block ids and opt block lengths parameters is related to the number of optional blocks. If the user does not correctly know the number of optional blocks, it may have allocated buffers that are too short. The opt block lengths parameter points to an array of 16-bit unsigned integer values. On successful return from the method, the array pointed to by this parameter is populated with the length in bytes of each of the optional blocks contained in the key block 400 in the same order they appear. This corresponds to the array returned in the opt block ids parameter. The total length of the returned list will be two times the number of optional blocks (a 16 bit unsigned integer is 2 bytes of storage), therefore the user must supply a buffer with a length at least two times the value it passes in the num opt blocks parameter.

Parameters for the rule array keyword DATA parameter include an opt block id parameter, an opt block data length parameter and an opt block data parameter. The opt block id parameter points to a 2-byte string which contains the identifier of the block for which the application is requesting data. The opt block data length parameter points to an integer variable containing the length for the opt block data parameter. On input, it must be set to the length of the buffer provided by the application program and, on output, it is updated to contain the length of the returned optional block data, in bytes. The opt block data parameter points to a buffer where the verb stores the data it reads from the specified optional block. The buffer must have enough space for the data, as indicated by the input value of the opt block data length parameter. On output, the optional block data corresponding to the opt block id parameter is copied to the buffer and its length is stored in the opt block data length parameter.

Figure 7:
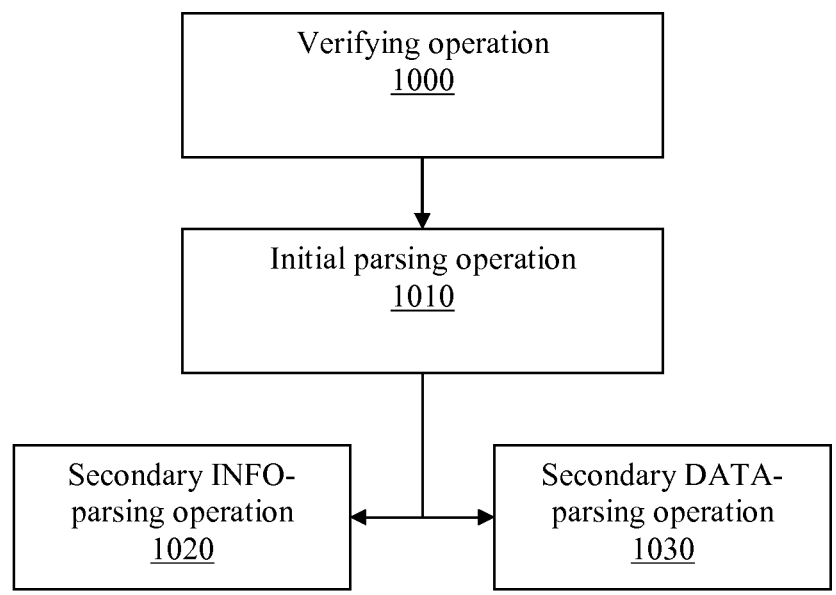
FIG. 7 is a flow diagram illustrating a method of parsing optional block data.

With reference to FIG. 7, the method includes a verifying operation 1000, an initial parsing operation 1010, a secondary INFO-parsing operation 1020 and a secondary DATA-parsing operation 1030. The verifying of operation 1000 includes a verification that none of the rule array, tr31 key length and tr31 key are absent (i.e., they are null pointers), a verification for the rule array keyword INFO that none of the num opt blocks, opt block ids and opt block lengths parameters are absent (i.e., they are null pointers) and a verification for the rule array keyword DATA that none of the opt block id, opt block data length and opt block data parameters are absent (i.e., they are null pointers). The verifying of operation 1000 further includes a verification that the tr31 key length parameter is not absent (i.e., that is not a null pointer), a verification for the rule array keyword INFO that the num opt blocks parameter is not absent (i.e., that it is not a null pointer) and a verification for the rule array keyword DATA that the opt block data length parameter is not absent (i.e., that it is not a null pointer). The verifying of operation 1000 still further includes a validation that the key block fields in the tr31 key parameter are allowed value ranges. This includes validating the key block formatting of data is in the proper format and that a version of the key block 400 is supported.

The initial parsing of operation 1010 parses the optional block data in the key block 400 referred to by the tr31 key parameter to validate it, determine its length and the number of optional blocks it contains. In accordance with the parsing, a count of optional blocks must correspond to the count noted in the key block field for this count and to the num opt blocks parameter, the length fields must be properly formatted, duplicate optional block tags are not allowed, numeric optional block tags are allowed and alphabetic block tags must conform to those of the key block 400.

The secondary INFO-parsing of operation 1020 is employed for when the rule array keyword INFO is present. Here, if no optional blocks are found, the method sets the num opt blocks parameter to indicate zero blocks and to return with an indication of success. Then, the key block in the tr31 key parameter is parsed iteratively to find the tag and length fields for each optional block in the header. While parsing, for each optional block encountered, the block is added to an array in the opt block ids parameter containing each of the block tags, in the order they appear in the header and to an array in the opt block lengths parameter containing each of the optional block lengths converted into the proper format in the order they appear in the header.

The secondary DATA-parsing of operation 1030 is employed for when the rule array keyword DATA is present. Here, if no optional blocks are found, the method aborts. Then, the key block in the tr31 key parameter is parsed iteratively with the tag of each compared to the value in the opt block id parameter. If the requested tag is not found before the end of the optional block section is reached, the method aborts. Then, the data section of that optional block is copied to the opt block data parameter, with a length indicated by the length field of the optional block, the length field of the optional block is converted and placed as a value into the opt block data length parameter and a successful notification is returned to the user.

Technical effects and benefits of the present invention include provision of a method of secure translation such that a user need not operate outside a hardware security module (HSM) and thus expose key material. In accordance with the method, the user need not question an array validity of optional blocks and a resulting array may be directly used when creating a standardized key block. Also, the user is directly enabled to export key tokens to key blocks and to import those key blocks to key tokens without losing the key token information.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
   initially verifying a presence of parameters passed to a parameter database and that a selected group of the parameters are greater than or equal to zero, the parameters including a rule array parameter, a tr31 key parameter, a key block length parameter, a number of optional blocks parameter and an optional block data length parameter and the selected group of the parameters including a key block length parameter, a number of optional blocks parameter and an optional block data length parameter;
   parsing optional block data to validate the optional block data, determine a length thereof and a number of optional blocks contained therein; and
   proceeding with one of a secondary info-parsing and a secondary data-parsing operation with respect to the optional block data in accordance with the rule array parameter being info or data, respectively,
   wherein the secondary info-parsing comprises setting the number of optional blocks parameter to indicate zero blocks in an event that no optional blocks are found and to return with an indication of success and iteratively parsing a key block in the tr31 key parameter to find a tag and length field for each optional block, and
   wherein the secondary data-parsing comprises aborting in an event no optional blocks are found in the tr31 key parameter, iteratively parsing the key block to confirm whether each of the tags in each optional block compares to a corresponding value in an optional block identification parameter and, if a corresponding one of the tags is not found, aborting, copying a data section of an optional block to an optional block data parameter and placing a length value of the optional block into an optional block data length parameter.

2. The method according to claim 1, wherein the initial verification comprises a validation that key block fields are within allowed value ranges.

3. The method according to claim 1, wherein the initial parsing comprises confirming that a count of optional blocks corresponds to a count noted in the parameters.

4. The method according to claim 1, wherein, during the iterative parsing and for each optional block encountered, adding information about or from the optional block to an array in a corresponding one of the parameters in an order of appearance,
   the information including optional block identifications and optional block lengths.

* * * * *